March 25, 1969     R. W. LITTLEFIELD     3,434,230
FISH LURE
Filed Jan. 11, 1966
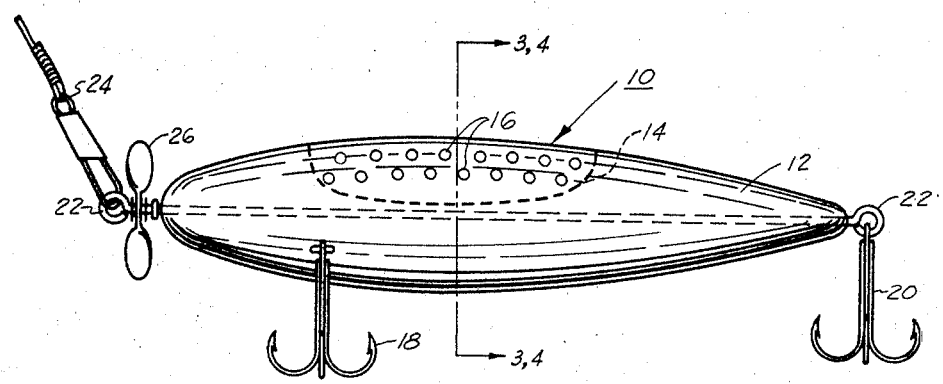
FIGURE 1
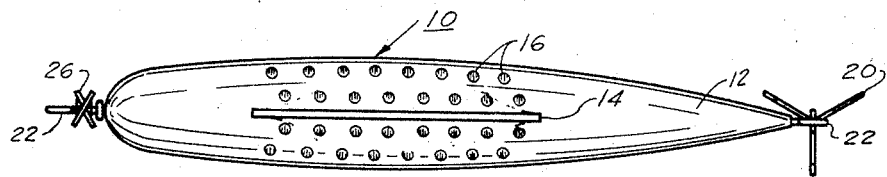
FIGURE 2
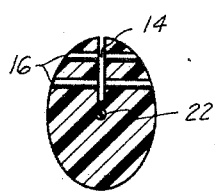     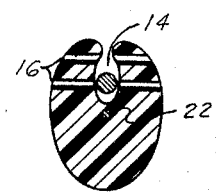
FIGURE 3     FIGURE 4
ROBERT W. LITTLEFIELD
INVENTOR.
BY *Francis P. Masselle*
ATTORNEY

United States Patent Office

3,434,230
Patented Mar. 25, 1969

3,434,230
FISH LURE
Robert W. Littlefield, 327 Boulevard,
Pompton Plains, N.J. 07444
Filed Jan. 11, 1966, Ser. No. 519,941
Int. Cl. A01k 85/00
U.S. Cl. 43—42.06     1 Claim

ABSTRACT OF THE DISCLOSURE

A fishing lure of monolithic, flexible plastic construction containing an axial slot-like cavity which gapes laterally when the lure is flexed to receive bait material and closes to hold the bait material when in unflexed condition. The lure body has an elongated generally cylindrical shape, and the body has transverse openings which also pass through the cavity.

---

This invention relates to fish lures generally and, in particular, to lures which employ bait.

It is now fairly well acknowledged that fish evidently can be attracted by the scent of bait, i.e., that their response to a lure is not exclusively visual. Even before this fact gained general acceptance, it appears to have been surmised by many anglers. At any rate, the prior art discloses various types of artificial lures which employ aromatic substances as an adjunct to physical appearance and movements designed to simulate natural bait. For the most part, these lures resort to means for dispensing or effusing fish oil to produce an attractive scent and, in all cases, have various disadvantages. Many are structurally complex and/or inconvenient to charge with the fish oil, requiring partial dismantlement of the lure. Others contain absorbant materials which are an integral part of the lure so that, once soaked with fish oil, the lure becomes a permanent source of noxious order. In no case are the lures adapted to contain a natural or live bait.

With the foregoing state of the art in view, it is the general object of the present invention to provide a novel fish lure which overcomes or mitigates at least one of the problems of the prior art as outlined above.

A particular object of the invention is the provision of a simple, effective and durable lure which can be produced at low cost and is adapted to contain any of a variety of baits.

Another object is the provision of a fish lure as characterized in the preceding object which permits extremely simple insertion and removal of bait and is susceptible of thorough cleansing to remove residual odors.

To the accomplishment of these and other objects, the invention contemplates a fish lure comprising a body member constructed of a resilient flexible material and having a hook secured thereto. The body member contains a cavity opening at an external surface thereof and having one dimension which is small in comparison to the remaining dimensions. The cavity is so disposed and oriented in the body member that said one dimension may be enlarged very substantially by flexing of the body in order to permit insertion and removal of bait material into and out of the cavity.

Additional objects of the invention, its advantages, scope and the manner in which it may be practised will be more fully apparent to persons conversant with the art from the following description of an exemplary embodiment thereof and of the annexed drawing in which like parts are designated by like reference numerals throughout the several views, and wherein:

FIGURE 1 is a side elevational view of a lure in accordance with the invention;

FIGURE 2 is a top view of the lure shown in FIGURE 1;

FIGURE 3 is a sectional view as indicated by the line 3,4–3,4 in FIGURE 1; and

FIGURE 4 is a sectional view identical to FIGURE 3 with the cavity shown in its enlarged condition.

Referring now to the drawings, there is illustrated a lure 10 constituting an exemplary embodiment of the present invention. Lure 10 comprises a body member 12 which may take a variety of specific configurations but is shown, for sake of example, in the form of a minnow-shaped "plug." Whatever other shape may be employed, body member 12 would ordinarily tend to be of streamlined form, elongated in the direction in which it is to be drawn through the water in use.

In accordance with an essential feature of the invention, body member 12 is constructed of a resilient, flexible material such as rubber or a pliable plastic and contains an internal cavity 14 which opens on one surface of the body member, the upper surface in the illustrated embodiment. Body member 12 preferably is molded or otherwise formed as a monolithic unit.

Cavity 14 is a slot-form configuration having sidewalls closely spaced and parallel to each other throughout the total extent of said cavity, said sidewalls extending longitudinally of the lure body member. The normal width dimension of cavity 14 is small in comparison to its length (considered to be the dimension along the longitudinal axis of the body member) and its depth. In the drawings the length of cavity 14 is shown as being about three times the depth and the width (in the relaxed or unenlarged condition) about one-tenth of the depth. As the cavity functions to contain and retain bait as hereinafter described with particularity, its size and shape are such as to adapt it to this purpose generally and, specifically, to the type or types of bait to be used. Moreover, the size, shape and orientation of cavity 14 are such that the cavity can be made to gape, with a multifold increase in the width dimension, by flexing the body member, as by applying downward pressure at the middle and upward pressure at the ends to cause it to assume an arcuate or crescent shape.

Preferably, the side walls of body member 12 contain a plurality of perforations or "seep holes" 16 which extend into cavity 14 and facilitate dissemination of the bait scent into the water.

To provide for the attachment of hooks, such as treble hooks 18, 20, body member 12 contains an axially extending wire 22 which extends to and terminates at the respective ends of the body member. At the head end of body member 12, wire 22 projects to provide a secure point of attachment for a fishing line or leader 24 and, if desired, a mounting for a spinner 26. Hook 18 may be secured to longitudinal wire 22 by means of a short lateral wire, not shown. In this manner, reliable line and hook attachments may be accomplished despite the flexibility of the material of body member 14.

The material may be any of a wide variety of flexible rubbers or plastics which are commercially available. It should be durable, water-resistant, and capable of retaining its flexibility over at least the range of temperatures encountered in service, including the low temperatures to which it might be exposed in ice fishing. One example of a plastic well-suited to the fabrication of body member 12 is polyvinyl acetate of the type available from Du Pont under the propietary designation "Alathon," and ethylene/vinyl acetate copolymer.

The exterior of the body member may be in its natural color or may be painted in accordance with conventional techniques to enhance its visual attractiveness to fish.

Baiting of the lure is accomplished quickly, easily, and neatly by simply flexing body member 12 so as to cause cavity 14 to gape, inserting the bait, and releasing the flexing pressure, whereupon the body member resumes its natural shape and the cavity closes on and firmly holds the bait.

Any desired type of bait may be used ranging from natural types such as grasshoppers, salmon eggs, and worms to artifacts like absorbent cotton dipped in fish oil or various commercially available baits such as dried blood pellets.

What is claimed is:

1. A fish lure comprising a body member, with at least one fish hook secured thereto, constructed of a resilient flexible material, said body member being of elongated, generally streamlined configuration and containing a cavity opening at a surface thereof and having one dimension which is small in comparison to the remaining dimensions, said cavity taking the form of a slot so oriented and disposed in said body member that said one dimension can be enlarged very substantially by flexing said body member, said slot-form cavity extending longitudinally of said body member in a plane substantially coinciding with a plane of symmetry of said body member, whereby gaping of the cavity is produced by flexure of said body member about an axis substantially perpendicular to said plane, with a concomitant multifold increase in the width of the cavity, said body member containing a plurality of perforations extending from the exterior surface into the cavity, said cavity having sidewalls extending longitudinally of the lure body member and closely spaced and parallel to each other throughout the total extent of said cavity.

References Cited

UNITED STATES PATENTS

| 2,004,308 | 6/1935 | Catarau | 43—42.06 |
| 2,556,634 | 6/1951 | Redinger. | |
| 2,797,517 | 7/1957 | Eriksen | 43—42.06 |
| 2,908,988 | 10/1959 | Kramer | 43—42.06 |

FOREIGN PATENTS

| 1,025,393 | 1/1953 | France. |
| 68,217 | 10/1957 | France. |

SAMUEL KOREN, *Primary Examiner.*

J. H. CZERWONKY, *Assistant Examiner.*